(12) United States Patent
Harada et al.

(10) Patent No.: US 9,943,926 B2
(45) Date of Patent: Apr. 17, 2018

(54) PRESS-FIT JOINING APPARATUS

(71) Applicant: TK Co., Ltd., Kamiina-gun, Nagano (JP)

(72) Inventors: Kazuyoshi Harada, Nagano (JP); Koji Harada, Nagano (JP); Kiyoshi Takemura, Nagano (JP); Akira Nozue, Nagano (JP)

(73) Assignee: TK CO., LTD., Nagano (JP)

( * ) Notice: Subject to any disclaimer, the term of this patent is extended or adjusted under 35 U.S.C. 154(b) by 769 days.

(21) Appl. No.: 14/400,533

(22) PCT Filed: Jan. 21, 2014

(86) PCT No.: PCT/JP2014/051148
§ 371 (c)(1),
(2) Date: Nov. 11, 2014

(87) PCT Pub. No.: WO2015/111140
PCT Pub. Date: Jul. 30, 2015

(65) Prior Publication Data
US 2016/0271723 A1    Sep. 22, 2016

(51) Int. Cl.
*B23K 11/00* (2006.01)
*B23K 20/02* (2006.01)
(Continued)

(52) U.S. Cl.
CPC ............ *B23K 20/023* (2013.01); *B23P 11/00* (2013.01); *B23P 19/02* (2013.01); *B23K 2201/005* (2013.01); *B23K 2201/006* (2013.01)

(58) Field of Classification Search
CPC ..... B23K 11/11; B23K 11/02; B23K 111/115; B23K 11/31
(Continued)

(56) References Cited

U.S. PATENT DOCUMENTS 1,776,615 A * 9/1930 Boothman ............. B21D 39/04
                                              285/148.11
2,202,405 A * 5/1940 Smith ................. B23K 11/0046
                                              219/107
(Continued)

FOREIGN PATENT DOCUMENTS

JP    2001353628 A    12/2001
WO    2006109650 A1   10/2006

OTHER PUBLICATIONS

International Search Report dated Apr. 22, 2014, in International Application No. PCT/JP2014/051148.

*Primary Examiner* — Dana Ross
*Assistant Examiner* — Ayub Maye
(74) *Attorney, Agent, or Firm* — Hauptman Ham, LLP

(57) ABSTRACT

The present invention provides a press-fit joining apparatus 100 where two collet-chuck-type electrodes (first collet-chuck-type electrode 160 and second collet-chuck-type electrode 170) are held using a die set structural body 130 and a sub platen structural body 140. According to the press-fit joining apparatus 100 of the present invention, it is possible to manufacture a product which is required to have higher coaxiality and higher joining strength than conventional products (for example, products such as a drive force transmitting part, the manufacture of which requires the supply of a large and uniform electric current to a joining portion).

10 Claims, 15 Drawing Sheets

(51) Int. Cl.
*B23P 19/02* (2006.01)
*B23P 11/00* (2006.01)
*B23K 101/00* (2006.01)

(58) Field of Classification Search
USPC ..... 219/86.1, 86.25, 86.33, 86.51, 86.23, 81
See application file for complete search history.

(56) References Cited

U.S. PATENT DOCUMENTS

| | | | | |
|---|---|---|---|---|
| 3,823,299 | A * | 7/1974 | Metcalfe | B21B 45/004 219/110 |
| 5,519,182 | A * | 5/1996 | Linzell | B23K 20/12 219/117.1 |
| 6,253,989 | B1 * | 7/2001 | Bennett | B23K 9/04 228/134 |
| 7,385,156 | B2 * | 6/2008 | Nozue | B23K 11/02 219/101 |
| 7,930,825 | B2 * | 4/2011 | Fochtman | B23K 26/0823 123/470 |
| 2013/0133785 | A1 * | 5/2013 | Nozue | B23K 20/021 148/526 |

* cited by examiner

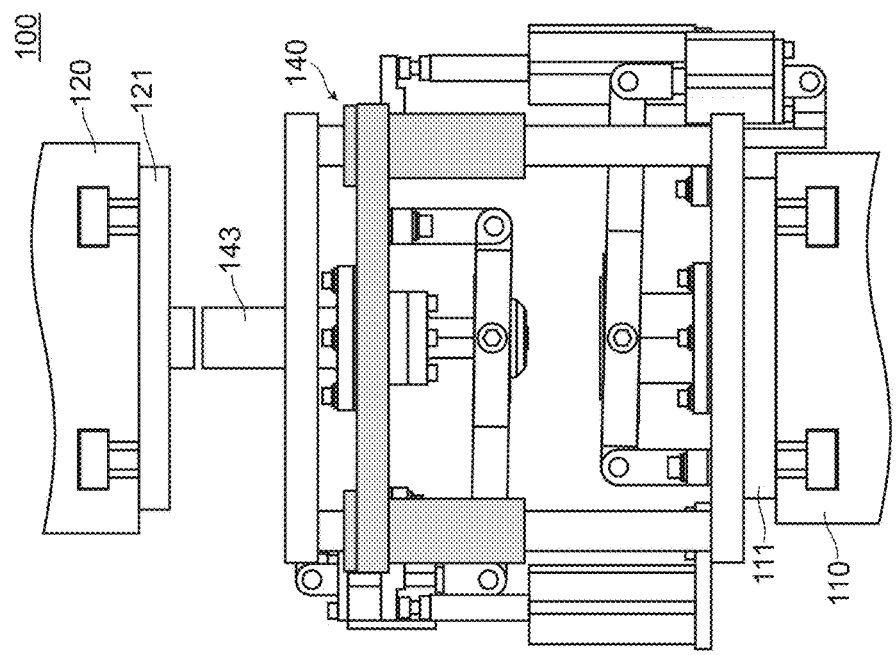
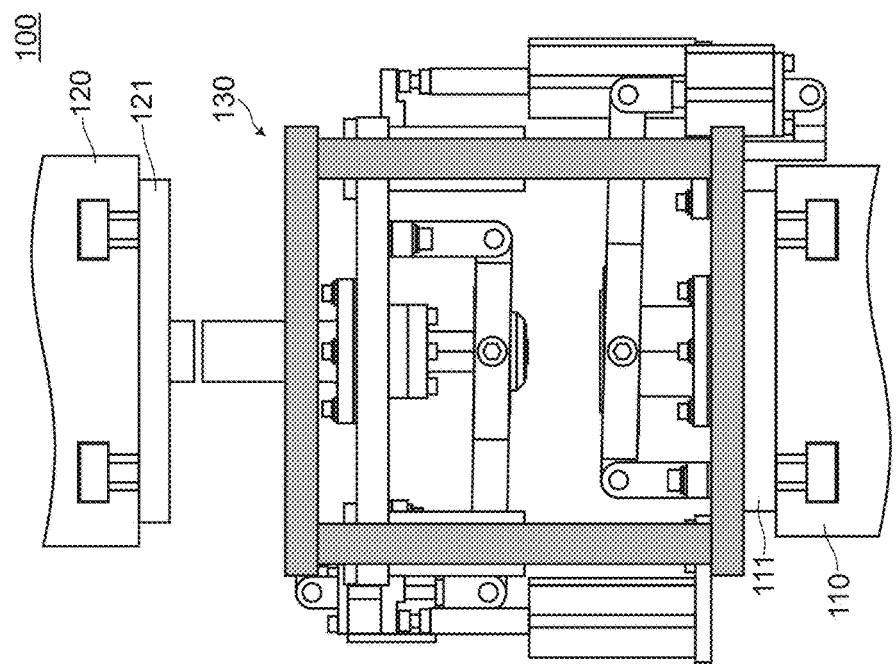

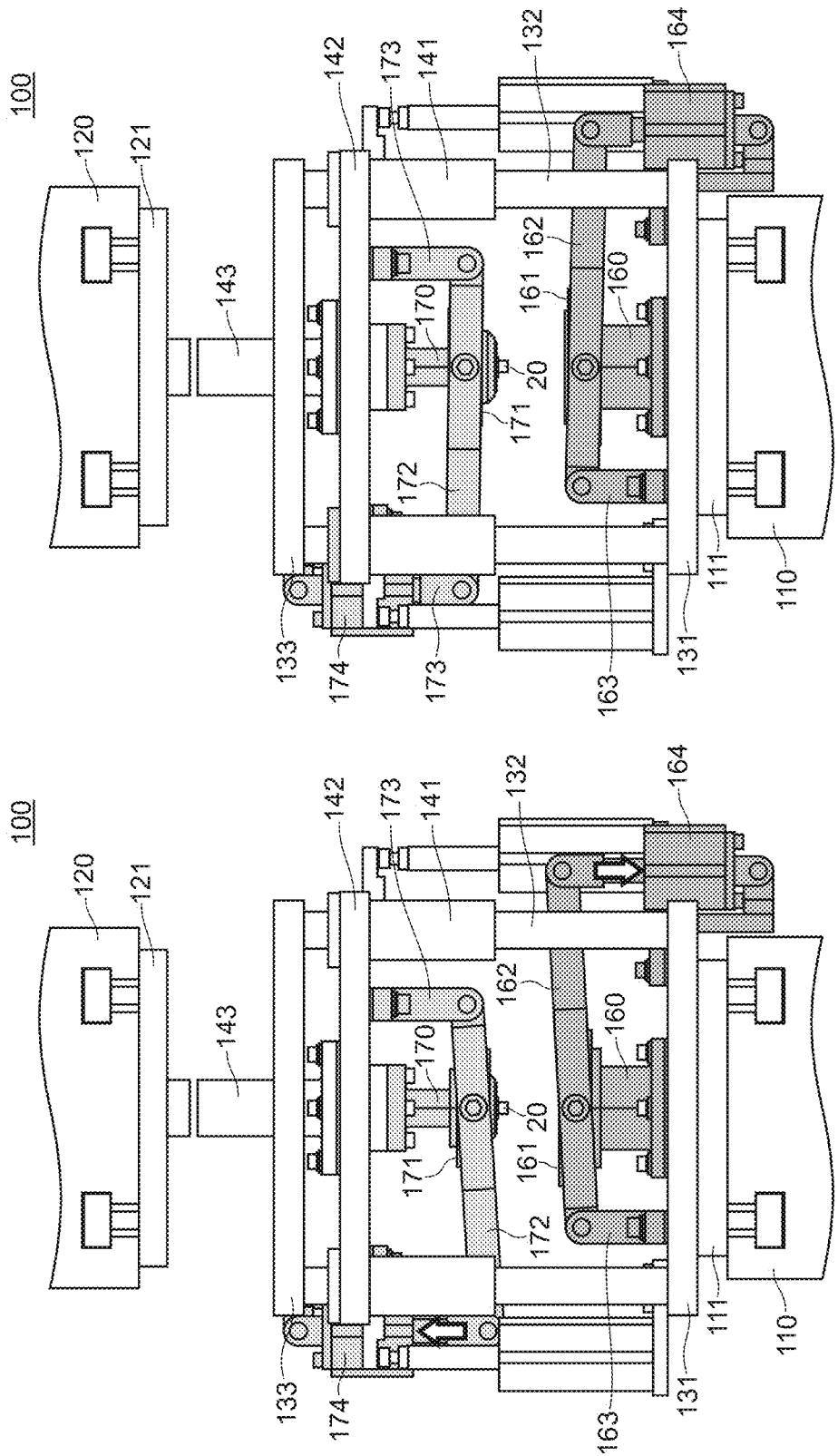

1

PRESS-FIT JOINING APPARATUS

RELATED APPLICATIONS

The present application is a National Phase of International Application Number PCT/JP2014/051148, filed Jan. 21, 2014.

TECHNICAL FIELD

The present invention relates to a press-fit joining apparatus.

BACKGROUND ART

Conventionally, in the manufacture of metal-made element parts used in automobiles or the like, usually, parts are joined to each other by arc welding or the like. For example, in the case of joining a shaft body to a plate, the shaft body is fitted into a hole formed in the plate by fitting engagement, and the whole circumference or a portion of the fitting engagement portion in which the shaft body is fitted is welded by arc welding using filler metal. Further, a resistance welding method such as a spot welding method or a projection welding method, and a method of joining parts by caulking has been also used.

However, the joining method such as arc welding has the following drawback. That is, due to the thermal deformation of the plate, the shaft body or the like by welding heat generated in arc welding or the like and hence, a base material of the plate, the shaft body or the like thermally deteriorates, and a size of the plate, the shaft body or the like is distorted, and such thermal deterioration and the distortion in size inevitably affect the accuracy of size of the plate, the shaft body or the like. In this case, there arises a drawback that finishing after welding such as working for increasing accuracy of a product by applying post-working after welding or shaving of undesired filler metal at a welded portion takes considerable time, effort and cost.

A lap resistance welding method has been mainly used as a resistance welding method, and in all lap resistance welding methods, joining is performed by forming a molten structure referred to as nuggets at a joining portion. In the lap resistance welding method, the only way to strengthen the welding is to increase the number of nuggets thus eventually giving rise to a drawback that the thermal deterioration of a joining base material and the exerting of adverse influence on accuracy of size cannot be avoided. Although melt welding exhibits a large joining strength, the base material is thermally affected in a wide range and hence, melt welding causes thermal deterioration and considerably affects accuracy of size adversely thus giving rise to a drawback that post-working or the like is necessary thus pushing up a manufacturing cost.

In view of such drawbacks, an applicant of this application and others developed a press-fit joining method where an electric current is supplied between a plate body and a shaft body while press-fitting the shaft body into a hole portion of the plate body with a predetermined pressure thus generating electric resistance heat at a joining portion between the plate body and the shaft body so that the shaft body is press-fitted into the hole portion of the plate body whereby the hole portion of the plate body and the shaft body are joined to each other by solid-phase diffusion joining, and such a press-fit joining method has been put into practice (see Patent literatures 1, 2, for example).

FIG. 15 is a view for explaining a conventional press-fit joining method. In the conventional press-fit joining method, as shown in FIG. 15, an electric current is supplied between a plate body and a shaft body while press-fitting a shaft body 903 into a hole portion 902 of the plate body (plate) 901 with a predetermined pressure while having a press-fitting margin between the shaft body 903 and the hole portion 902 of the plate body 901 thus generating electric resistance heat at a joining portion between the plate body 901 and the shaft body 903, the shaft body 903 is press-fitted into the hole portion 902 of the plate body 901 whereby the hole portion 902 of the plate body 901 and the shaft body 903 are joined to each other by solid-phase diffusion joining. In FIG. 15, symbol 904 indicates a lower electrode, and symbol 905 indicates an upper electrode.

The conventional press-fit joining method is a method of joining a plate body and a shaft body by press-fitting which can manufacture products having excellent finishing accuracy and also excellent strength with a high economic effect.

PRIOR ART LITERATURE

Patent Literature

Patent literature 1: JP-A-2001-353628
Patent literature 2: International Publication 2006/109650

SUMMARY OF THE INVENTION

Task to be Solved by the Invention

As described above, the conventional press-fit joining method is an excellent press-fit joining method which can manufacture products having excellent finishing accuracy and also excellent strength with a high economic effect. However, along with the spread of the conventional press-fit joining method, there has been a demand for products which are required to have higher coaxiality and higher joining strength than conventional products (for example, products such as a drive force transmitting part, the manufacture of which requires the supply of a large and uniform electric current to a joining portion).

The present invention has been made in view of such circumstances, and it is an object of the present invention to provide a press-fit joining apparatus which can manufacture products which are required to have higher coaxiality and higher joining strength than conventional products (for example, products such as a drive force transmitting part, the manufacture of which requires the supply of a large and uniform electric current to a joining portion).

Means for Solving the Task

[1] The present invention is directed to a press-fit joining apparatus where an electric current is supplied between a first member having a hole portion and a second member having a shaft body portion with a predetermined press-fitting margin between the shaft body portion and the hole portion of the first member while pressing the shaft body portion of the second member to the hole portion of the first member with a predetermined pressure thus generating electric resistance heat in a joining portion between the first member and the second member so that the shaft body portion of the second member is press-fitted into the hole portion of the first member whereby the hole portion of the first member and the shaft body portion of the second member are joined to each other by solid-phase diffusion joining, wherein the press-fit joining apparatus includes: a housing; a power source device; a pressing device; a lower platen fixed to the housing and connected to one electrode of the power source device; an upper platen connected to the other electrode of the power source device and capable of being pressed down toward the lower platen by the pressing device; a die set structural body including: a shaft receiving plate fixed to the lower platen; a plurality of slide shafts mounted on the shaft receiving plate in a raised manner; and a shaft fixing plate fixed by the plurality of slide shafts and having a hole at a center portion thereof; a sub platen structural body including: a plurality of bearing mechanisms which are respectively pivotally supported on the plurality of slide shafts and a sub platen fixed to the bearing mechanism and being mounted on the plurality of slide shafts by way of the bearing mechanisms in a vertically movable manner with respect to the plurality of slide shafts, and capable of being pressed down toward the lower platen by the pressing device by way of the upper platen and the spacer arranged between the upper platen and the sub platen; an elastic mechanism for returning a height position of the sub platen structural body pressed down by the pressing device to an original position; a first collet-chuck-type electrode mounted on the shaft receiving plate, and having three or more slits formed therein; and a second collet-chuck-type electrode mounted on the sub platen, and having three or more slits formed therein.

According to the press-fit joining apparatus of the present invention, as electrodes for allowing an electric current (welding current) to flow between the first member and the second member, two collet-chuck-type electrodes (the first collet-chuck-type electrode and the second collet-chuck-type electrode) are provided and hence, an electric current uniformly flows over the whole circumference of the joining portion between the first member and the second member whereby coaxiality between the first and second members and a strength of joining between the first member and the second member are enhanced.

Further, according to the press-fit joining apparatus of the present invention, two electrodes (the first collet-chuck-type electrode and the second collet-chuck-type electrode) are held using the above-mentioned die set structural body and sub platen structural body and hence, the rigidity of the press-fit joining apparatus is increased. Accordingly, a mouth opening phenomenon which occurs in a conventional C-shaped frame housing (see FIG. 14C described later) does not occur in the press-fit joining apparatus of the present invention whereby the press-fit joining apparatus can acquire high runout accuracy. Further, even when a large force which attracts the first member and the second member is generated on a transformer side by a strong magnetic field generated in the transformer of a power source device (see FIG. 14D described later), the rigidity of the die set structural body and the sub platen structural body is increased as described above and hence, the coaxiality of the first member and the second member held by two electrodes which are mounted on the die set structural body and the sub platen structural body can be maintained at a high level.

Further, according to the press-fit joining apparatus of the present invention, two collet-chuck-type electrodes (the first collet-chuck-type electrode and the second collet-chuck-type electrode) are held using the above-mentioned die set structural body and sub platen structural body and hence, the respective works can be clamped by the respective collet-chuck-type electrodes with high axial accuracy with reference to outer diameters of the works (the first member and the second member) and hence, the respective works can be held with excellent axial accuracy by the respective collet-chuck-type electrodes. Accordingly, the coaxiality of the first member and the second member (coaxiality of the hole portion of the first member and a shaft body portion of the second member) can be easily increased.

As a result, the press-fit joining apparatus of the present invention becomes a press-fit joining apparatus which can manufacture products which are required to have higher coaxiality and higher joining strength than prior art (for example, products such as a drive force transmission part, the manufacture of which requires the supply of a large and uniform electric current to a joining portion).

[2] In the press-fit joining apparatus according to the present invention, it is preferable that both the first collet-chuck-type electrode and the second collet-chuck-type electrode respectively include an outer peripheral portion which has an outer peripheral tapered portion whose outer diameter is gradually increased in the proximal end direction, and the press-fit joining apparatus further includes: a first ring member which includes an inner peripheral portion having an inner peripheral tapered portion corresponding to the outer peripheral tapered portion of the first collet-chuck-type electrode, the first ring member being configured to fastening the first collet-chuck-type electrode from an outer peripheral side from being made to move in the proximal end direction of the first collet-chuck-type electrode thus allowing the first collet-chuck-type electrode to clamp the first member, and a second ring member which includes an inner peripheral portion having an inner peripheral tapered portion corresponding to the outer peripheral tapered portion of the second collet-chuck-type electrode, the second ring member being configured to fastening the second collet-chuck-type electrode from an outer peripheral side from being made to move in the proximal end direction of the second collet-chuck-type electrode thus allowing the second collet-chuck-type electrode to clamp the second member.

Due to such a constitution, work can be uniformly and easily fastened with reference to the outer diameter of the work (the first part and the second part).

[3] In the press-fit joining apparatus according to the present invention, it is preferable that the first ring member is vertically movably mounted on a first ring member holding fitting which is mounted on the shaft receiving plate, and the second ring member is vertically movably mounted on a second ring member holding fitting which is mounted on the sub platen.

Due to such a constitution, work can be uniformly and rapidly fastened with reference to the outer diameter of the work (the first part and the second part). Particularly, by combining the first ring member holding fitting and the second ring member holding fitting with the pneumatic cylinder mechanism, compared to a case where the work is fastened by screw fastening, a time necessary for carrying out the whole press-fit joining step can be largely shortened.

[4] In the press-fit joining apparatus according to the present invention, it is preferable that the first collet-chuck-type electrode is configured such that an angle of the outer peripheral tapered portion with respect to an axis of the first collet-chuck-type electrode falls within a range of 1° to 70°, and the second collet-chuck-type electrode is configured such that an angle of the outer peripheral tapered portion with respect to an axis of the second collet-chuck-type electrode falls within a range of 1° to 70°.

Due to such a constitution, at the time of moving (sliding) the respective ring members (the first ring member and the second ring member) in the proximal end directions of the respective collet-chuck-type electrodes (the first colletchuck-type electrode and the second collet-chuck-type electrode), such a moving (sliding) operation can be efficiently converted into a work fastening operation. From this point of view, it is preferable that the above-mentioned angle falls within a range of 2° to 45°. It is further more desirable that the above-mentioned angle falls within a range of 3° to 20°.

[5] In the press-fit joining apparatus according to the present invention, it is preferable that both the first ring member and the second ring member are made of a metal material harder than a material for forming the first collet-chuck-type electrode and a material for forming the second collet-chuck-type electrode.

Due to such a constitution, by making the first ring member move (slide) in the proximal end direction of the first collet-chuck-type electrode, the first member can be surely clamped by the first collet-chuck-type electrode by fastening the first collet-chuck-type electrode from an outer peripheral side. Further, by making the second ring member move (slide) in the proximal end direction of the second collet-chuck-type electrode, the second member can be surely clamped by the second collet-chuck-type electrode by fastening the second collet-chuck-type electrode from an outer peripheral side.

[6] In the press-fit joining apparatus according to the present invention, it is preferable that a cooling medium flow passage is formed in the inside of at least one of the first ring member and the second ring member, and the press-fit joining apparatus is configured such that an electric current is supplied between the first member and the second member in a state where a cooling medium is made to flow through the cooling medium flow passage.

Due to such a constitution, with the use of two collet-chuck-type electrodes (the first collet-chuck-type electrode and the second collet-chuck-type electrode) having the tip split structural body where three or more slits are formed, at least one of these two collet-chuck-type electrodes can be cooled. As a result, it is possible to suppress electric resistance of at least one of these two collet-chuck-type electrodes from being increased. Further, it is possible to extend a lifetime of at least one of these two collet-chuck-type electrodes.

In this case, overheating of the collet-chuck-type electrode can be efficiently prevented even when compared with a conventional cooling mechanism (a mechanism which cools electrodes by way of a base plate by arranging a cooling water pipe in a platen).

In the press-fit joining apparatus of the present invention, it is more preferable that both the first ring member and the second ring member have the cooling medium flow passage in the inside thereof, and the press-fit joining apparatus is configured to supply an electric current between the first member and the second member while making a cooling medium flow through both of the cooling medium flow passage in the first ring member and the cooling medium flow passage in the second ring member.

Due to such a constitution, with the use of two collet-chuck-type electrodes (the first collet-chuck-type electrode and the second collet-chuck-type electrode) having the tip split structural body, both of these two collet-chuck-type electrodes can be cooled. As a result, it is possible to suppress electric resistance of both of these two collet-chuck-type electrodes from being increased. Further, it is possible to extend lifetimes of both of these two collet-chuck-type electrodes.

[7] In the press-fit joining apparatus according to the present invention, it is preferable that the lower platen, the upper platen, the shaft receiving plate, the shaft fixing plate and the sub platen are formed using a non-magnetic metal material.

Due to such a constitution, even under the presence of a strong magnetic field generated in the transformer of the power source device (see FIG. 14D described later), unlike the case where these members are formed using a magnetic metal material, it is possible to prevent a possibility that these members are easily magnetized. As a result, a possibility that an operational defect occurs in the press-fit joining apparatus becomes extremely low or a possibility that dust such as iron powder is attracted to these members can be eliminated.

[8] In the press-fit joining apparatus according to the present invention, it is preferable that the spacer is fixed to one of the sub platen and the upper platen, and the spacer is not fixed to the other platen.

In this manner, when the spacer is fixed to one of the sub platen and the upper platen but is not fixed to the other platen, the press-fit joining apparatus is not influenced by a mouth opening phenomenon which occurs due to the C-shaped frame housing.

[9] In the press-fit joining apparatus according to the present invention, it is preferable that the spacer is fixed to neither the sub platen nor the upper platen.

In this manner, when the spacer is fixed to neither the sub platen nor the upper platen, the press-fit joining apparatus is not influenced by a mouth opening phenomenon which occurs due to the C-shaped frame housing in the same manner as the press-fit joining apparatus described in the above-mentioned [8].

[10] In the press-fit joining apparatus according to the present invention, it is preferable that the second collet-chuck-type electrode has an exchangeable chuck member for holding the second member for every portion separated by respective slits.

With respect to each collet-chuck-type electrode, chuck portions which clamp a work are liable to be deteriorated as being influenced by wear generated due to a work fastening operation and electric resistance heat generated at the time of joining and hence, it is necessary to exchange each collet-chuck-type electrode at high frequency. As a result, there has been a drawback that a manufacturing cost is pushed up by an amount corresponding to the number of exchanges of the collet-chuck-type electrode. On the other hand, according to the press-fit joining apparatus of the present invention, since the press-fit joining apparatus has the above-mentioned constitution, with respect to at least the second collet-chuck-type electrode, it is sufficient to exchange only the chuck member instead of exchanging the collet-chuck-type electrode as a whole and hence, a manufacturing cost can be reduced.

From the above-mentioned viewpoint, it is further preferable that the first collet-chuck-type electrode also has an exchangeable chuck member for holding the first member for every portion separated by respective slits.

BRIEF DESCRIPTIONS OF THE DRAWINGS

FIG. 1A and FIG. 1B are views showing a mode in which a drive force transmitting part 30 is manufactured from a first member 10 and a second member 20.

FIG. 4A and FIG. 4B are side views for explaining the die set structural body 130 and the sub platen structural body 140.

FIG. 11A and FIG. 11B are views for explaining a collet chuck operation by pneumatic cylinder mechanisms 164, 174.

DESCRIPTION OF EMBODIMENTS

Hereinafter, a press-fit joining apparatus according to the present invention is explained based on an embodiment shown in drawings.

Embodiment

1. Press-Fit Joining Apparatus According to Embodiment

Figure 1A:
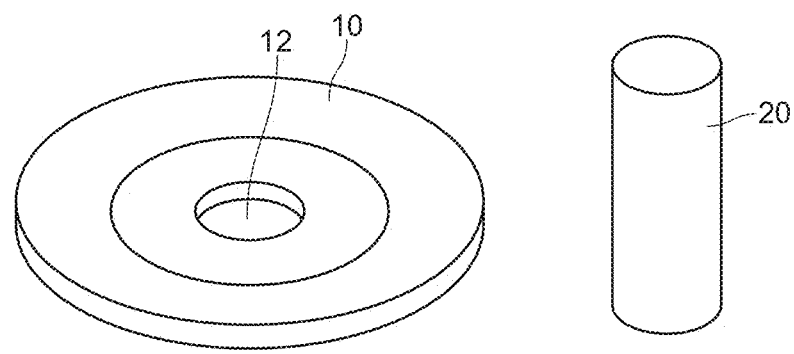
Figure 1B:
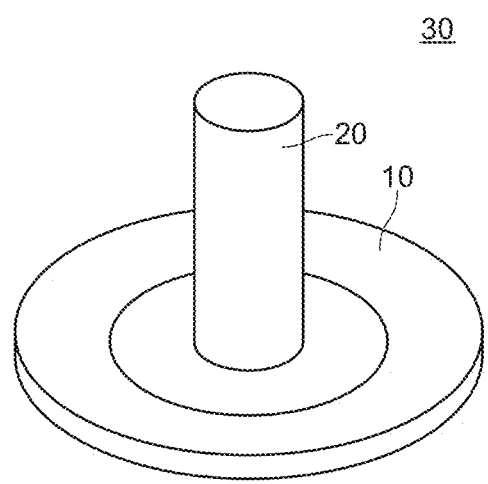

FIG. 1A and FIG. 1B are views showing a mode in which a drive force transmitting part 30 is manufactured from a first member 10 and a second member 20. FIG. 1A is a perspective view showing the first member 10 and the second member 20 before the second member 20 is press-fit into a hole portion 12 of the first member 10, and FIG. 1B is a perspective view showing a drive force transmitting part 30 manufactured by press-fitting the second member 20 into the hole portion 12 of the first member 10.

The first member 10 and the second member 20 are members for manufacturing the drive force transmitting part 30. As shown in the FIG. 1A, the first member 10 is a member having the hole portion 12, and the second member 20 is a member having a shaft body portion with a predetermined press-fit margin formed between the second member 20 and the hole portion 12 of the first member 10. In the press-fit joining apparatus 100 according to the embodiment, by supplying an electric current between the first member 10 and the second member 20 while press-fitting the shaft body portion of the second member 20 to the hole portion 12 of the first member 10 with a predetermined pressure, electric resistance heat is generated in a joining portion between the first member 10 and the second member 20, and the shaft body portion of the second member 20 is press-fit into the hole portion 12 of the first member 10 and hence, the hole portion 12 of the first member 10 and the shaft body portion of the second member 20 are joined to each other by solid-phase diffusion joining (see FIG. 1B). Hereinafter, the press-fit joining apparatus 100 according to the embodiment is explained by reference to FIG. 2 to FIG. 10.

Figure 2:
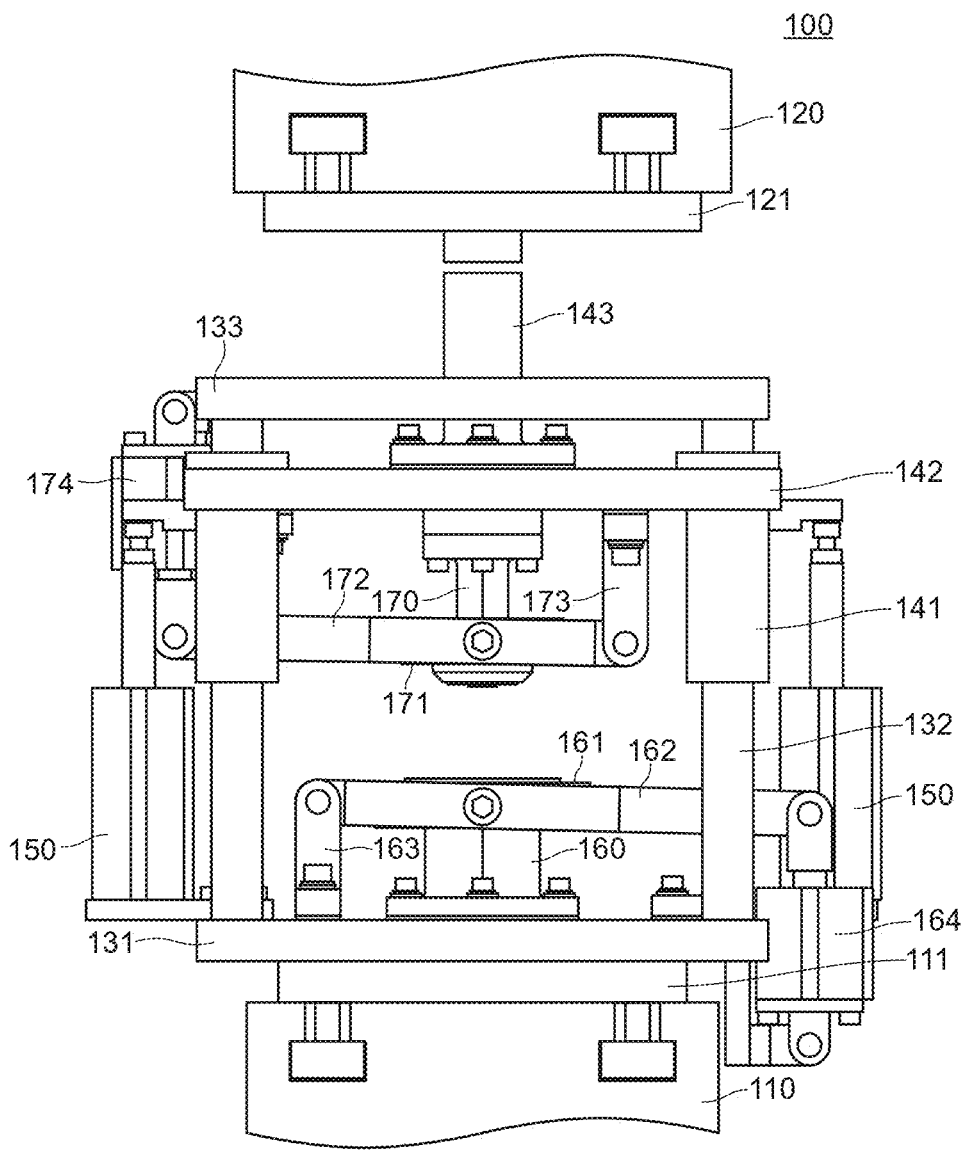
FIG. 2 is a side view for explaining a press-fit joining apparatus 100 according to an embodiment.

FIG. 2 is a side view for explaining the press-fit joining apparatus 100 according to the embodiment. In FIG. 2, the illustration of a housing, a power source device and a pressing device is omitted.

Figure 3:
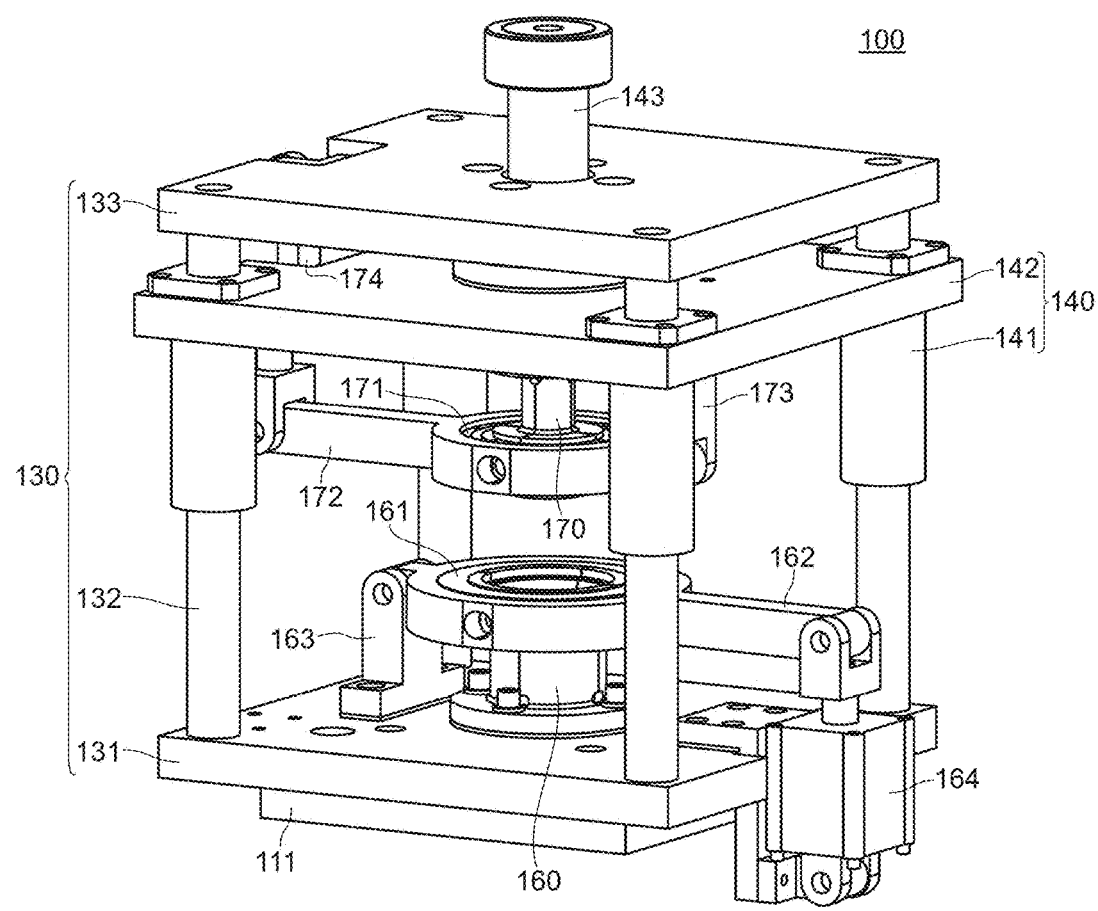
FIG. 3 is a perspective view for explaining a die set structural body 130 and a sub platen structural body 140.

FIG. 3 is a perspective view for explaining a die set structural body 130 and a sub platen structural body 140. In FIG. 3, the illustration of a lower platen 110, an upper platen 120 and a third pneumatic cylinder mechanism 150 is omitted.

FIG. 4A and FIG. 4B are the side views for explaining the die set structural body 130 and the sub platen structural body 140. In FIG. 4A and FIG. 4B, the lower platen 110 and the upper platen 120 whose illustrations are omitted in FIG. 3 are shown. Further, the die set structural body 130 is highlighted in FIG. 4A, and the sub platen structural body 140 is highlighted in FIG. 4B.

Figure 5A:
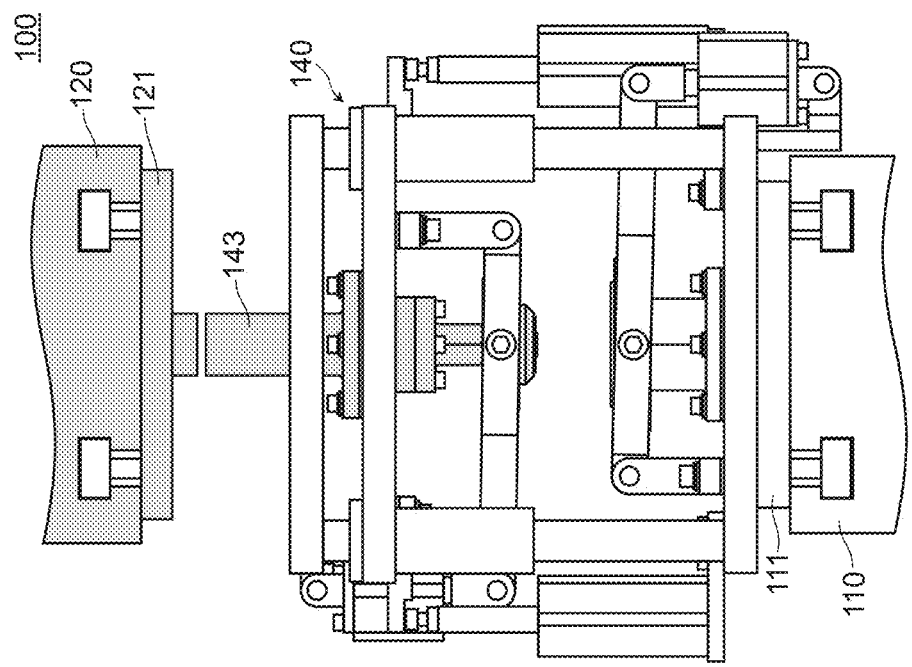
FIG. 5A and FIG. 5B are side views for explaining a current path in the press-fit joining apparatus 100 according to the embodiment.
Figure 5B:
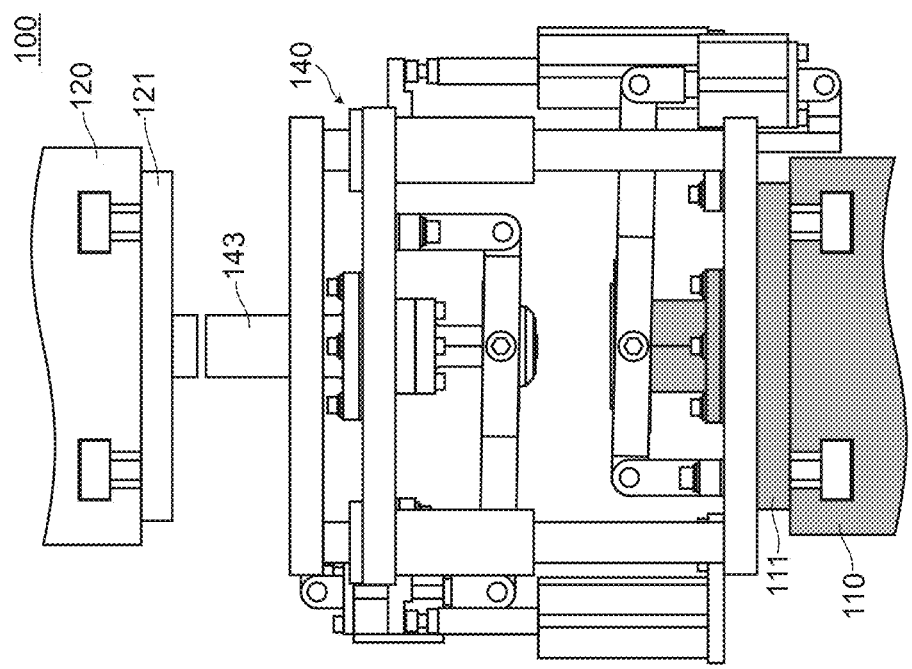

FIG. 5A and FIG. 5B are side views for explaining a current path in the press-fit joining apparatus 100 according the embodiment. In FIG. 5A and FIG. 5B, the lower platen 110 and the upper platen 120 whose illustrations are omitted in FIG. 3 are shown. Further, FIG. 5A shows a current path which starts from the lower platen 110 and reaches a first collet-chuck-type electrode 160, and FIG. 5B shows an electric path which starts from a second collet-chuck-type electrode 170 and reaches the upper platen 120.

Figure 6A:
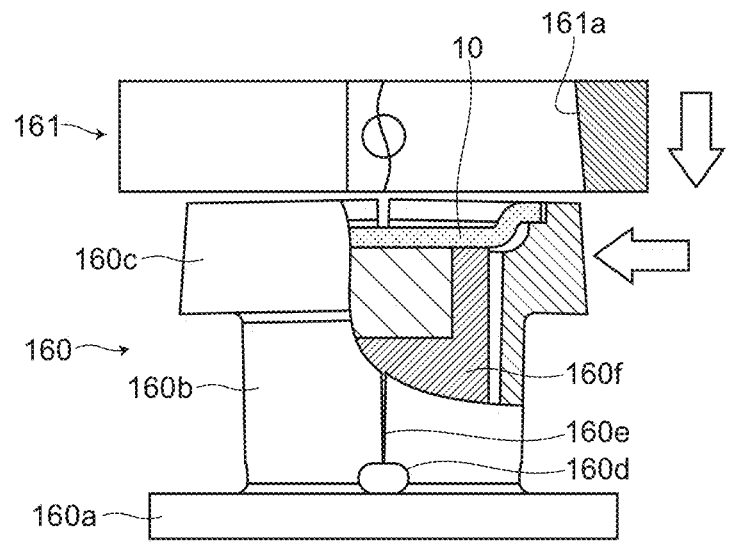
FIG. 6A and FIG. 6B are views for explaining a first collet-chuck-type electrode 160.
Figure 6B:
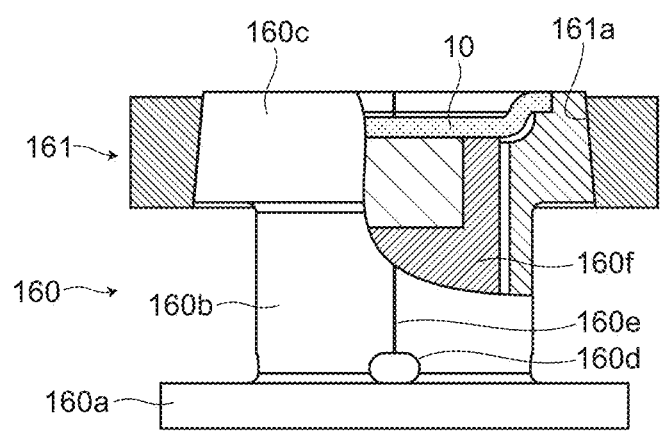

FIG. 6A and FIG. 6B are views for explaining the first collet-chuck-type electrode 160. FIG. 6A is a side view with a part in cross section showing a state before a first ring member 161 is descended, and FIG. 6B is a side view with a part in cross section showing a state after the first ring member 161 is descended.

Figure 7A:
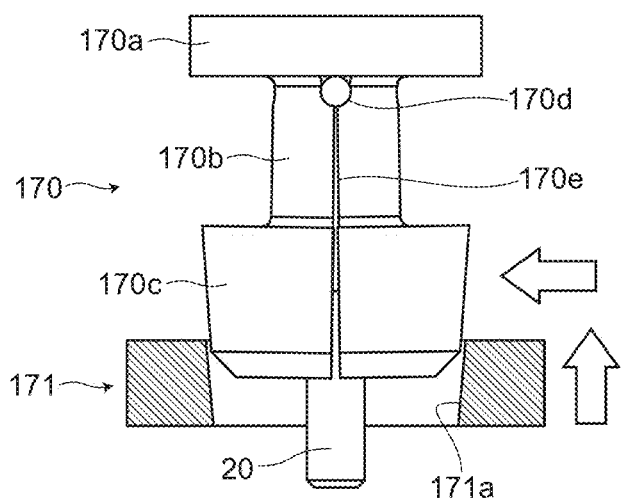
FIG. 7A and FIG. 7B are views for explaining a second collet-chuck-type electrode 170.
Figure 7B:
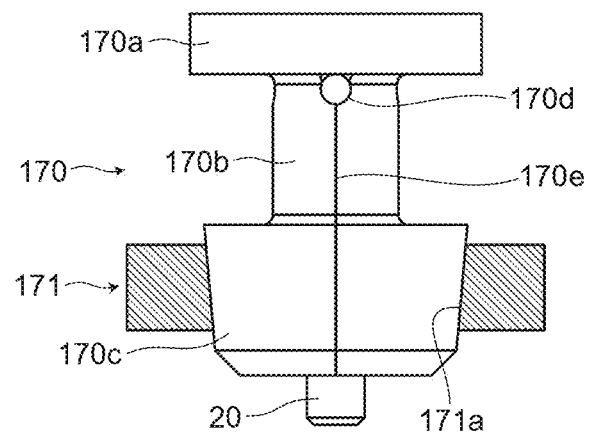

FIG. 7A and FIG. 7B are views for explaining the second collet-chuck-type electrode 170. FIG. 7A is a view showing a state before a second ring member 171 is ascended, and FIG. 7B is a view showing a state after the second ring member 171 is ascended. In FIG. 7A and FIG. 7B, the second collet-chuck-type electrode 170 is shown in a side view, and the second ring member 171 is shown in a cross-sectional view.

Figure 8A:
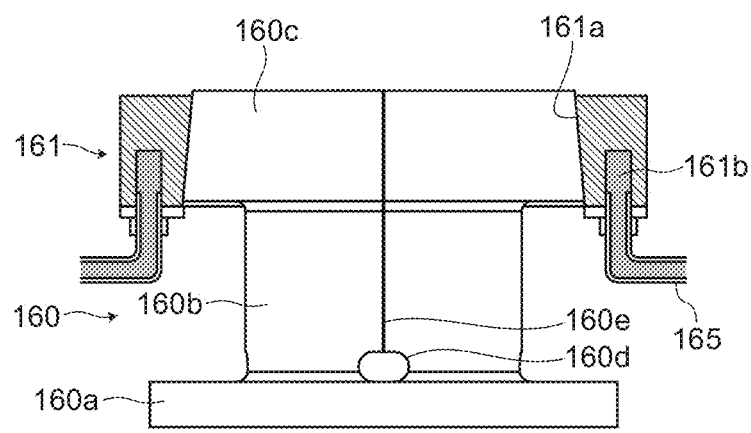
FIG. 8A and FIG. 8B are views for explaining a first cooling mechanism for cooling the first collet-chuck-type electrode 160.
Figure 8B:
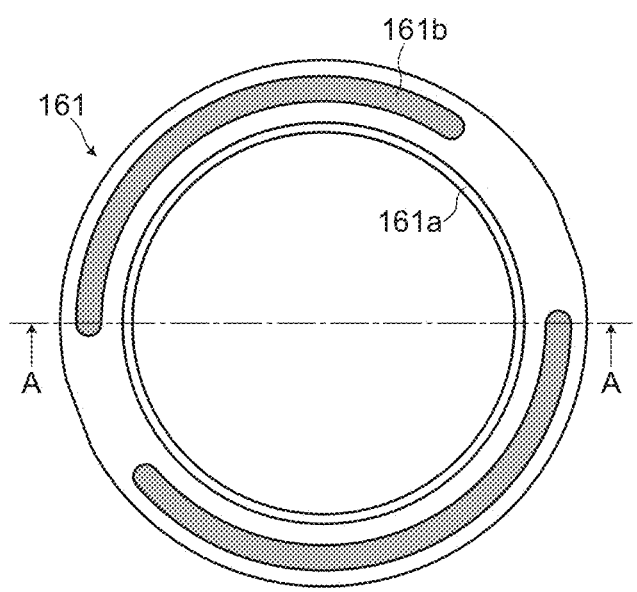

FIG. 8A and FIG. 8B are views for explaining a first cooling mechanism for cooling the first collet-chuck-type electrode 160. FIG. 8A is a longitudinal cross-sectional view for explaining the first cooling mechanism, and FIG. 8B is a transverse cross-sectional view for explaining the first cooling mechanism. In FIG. 8A, the first collet-chuck-type electrode 160 is shown in a side view.

Figure 9A:
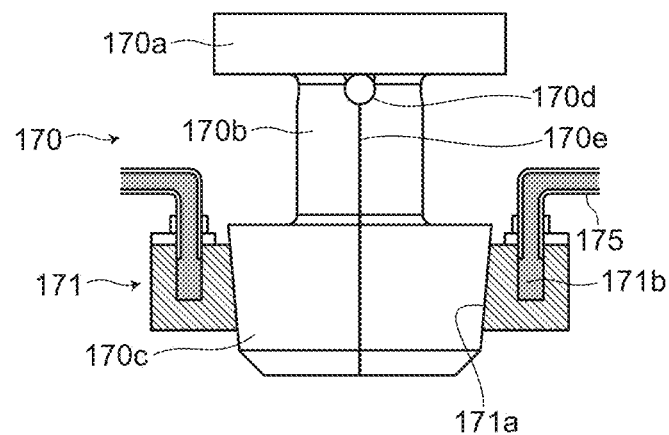
FIG. 9A and FIG. 9B are views for explaining a second cooling mechanism for cooling the second collet-chuck-type electrode 170.
Figure 9B:
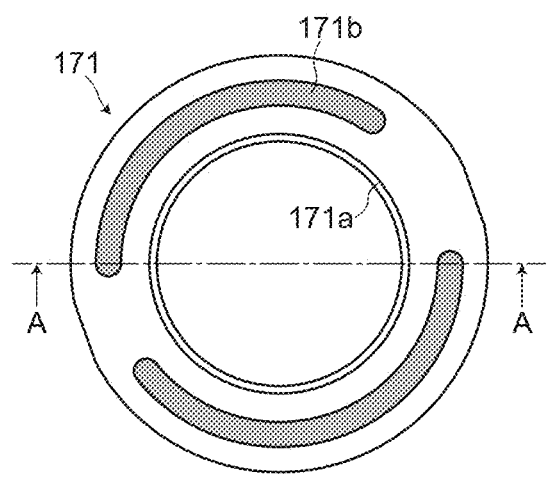

FIG. 9A and FIG. 9B are views for explaining a second cooling mechanism for cooling the second collet-chuck-type electrode 170. FIG. 9A is a longitudinal cross-sectional view for explaining the second cooling mechanism, and FIG. 9B is a transverse cross-sectional view for explaining the second cooling mechanism. In FIG. 9A, the second collet-chuck-type electrode 170 is shown in a side view.

Figure 10A:
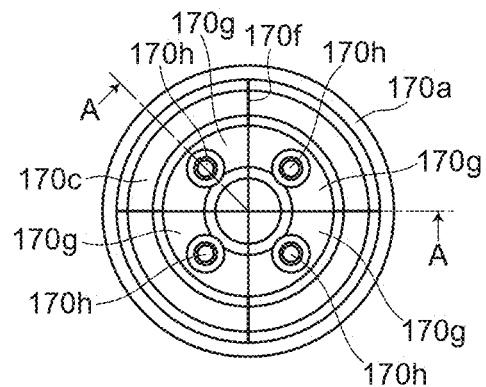
FIG. 10A and FIG. 10B are views for explaining a core 170g in the second collet-chuck-type electrode 170.
Figure 10B:
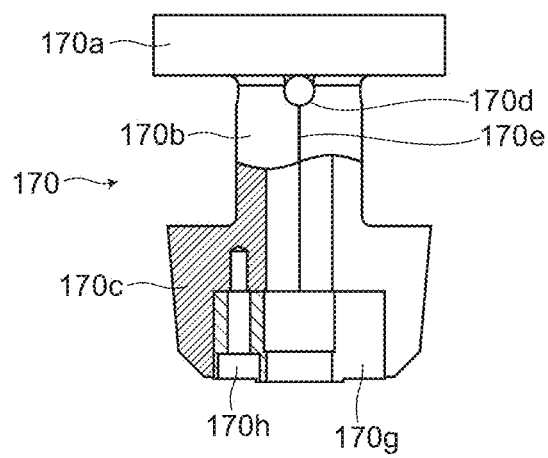

FIG. 10A and FIG. 10B are views for explaining a core 170g in the second collet-chuck-type electrode 170. FIG. 10A is a front view of the second collet-chuck-type electrode 170, and FIG. 10B is a cross-sectional view taken along a line A-A as viewed in a direction indicated by arrows in FIG. 10A.

As shown in FIG. 2 to FIG. 5B, the press-fit joining apparatus 100 according to the embodiment includes: a housing (not shown in the drawing); a power source device (not shown in the drawing); the pressing device (not shown in the drawing); the lower platen 110; the upper platen 120;

the die set structural body 130; the sub platen structural body 140; the third pneumatic cylinder mechanism 150; the first collet-chuck-type electrode 160; and the second collet-chuck-type electrode 170.

The lower platen 110 is fixed to the housing, and is connected to one electrode of the power source device.

The upper platen 120 is connected to the other electrode of the power source device, and is configured to be pressed down toward the lower platen 110 by the pressing device.

The die set structural body 130 includes: a shaft receiving plate 131 which is fixed to the lower platen 110 by way of the lower base plate 111 and has a hole formed in a center portion thereof; a plurality of slide shafts 132 which are mounted on the shaft receiving plate 131 in a raised manner; and a shaft fixing plate 133 which is fixed by the plurality of slide shafts 132 and has a hole formed in a center portion thereof.

The sub platen structural body 140 includes: a plurality of bearing mechanisms 141 respectively pivotally supported on the plurality of slide shafts 132; and a sub platen 142 vertically movably mounted on the plurality of slide shafts 132 in a relatively slidable manner byway of the bearing mechanisms 141. The sub platen structural body 140 is configured to be pressed down toward the lower platen 110 by the pressing device by way of the upper platen 120, the upper base plate 121, and a spacer 143 disposed between and the upper platen 120 and the sub platen 142. The bearing mechanism 141 is formed of a slide bushing which incorporates a ball bearing therein.

The third pneumatic cylinder mechanisms 150 have a function of elastic mechanisms for returning a height position of the sub platen structural body 140 pressed down by the pressing device to an original position. The third pneumatic cylinder mechanisms 150 may have a function of imparting a repulsive force to a pressing operation of the sub platen structural body 140 against a pressing operation of the sub platen structural body 140 when the sub platen structural body 140 is pressed downward.

The press-fit joining apparatus 100 according to the embodiment includes a pneumatic cylinder mechanism as the pressing device.

As shown in FIG. 6A and FIG. 6B, the first collet-chuck-type electrode 160 has a structural body in which three or more (in this case, four) slits 160e are formed, and the first collet-chuck-type electrode 160 is mounted on the shaft receiving plate 131 by way of an insulating member (see FIG. 2 to FIG. 5B). The first collet-chuck-type electrode 160 is electrically connected to the lower platen 110 at a portion of an electrode body portion 160f byway of the lower base plate 111. The first collet-chuck-type electrode 160 includes an outer peripheral portion having an outer peripheral tapered portion 160c whose outer diameter is increased in the proximal end direction. In FIG. 6A and FIG. 6B, symbol 160a indicates a base portion, symbol 160b indicates a barrel portion, symbol 160d indicates a slit base portion hole, symbol 160e indicates slit, and symbol 160f indicates electrode body portion.

As shown in FIG. 7A and FIG. 7B, the second collet-chuck-type electrode 170 has a structural body in which three or more (in this case, four) slits 170e are formed, and the second collet-chuck-type electrode 170 is mounted on the sub platen 142 byway of the spacer 143 (see FIG. 2 to FIG. 5B). The second collet-chuck-type electrode 170 is configured to be electrically connected to the upper platen 120 by way of the spacer 143 and the upper base plate 121. The second collet-chuck-type electrode 170 includes an outer peripheral portion having an outer peripheral tapered portion 170c whose outer diameter is increased in the proximal end direction. In FIG. 7A and FIG. 7B, symbol 170a indicates a base portion, symbol 170b indicates a barrel portion, symbol 170d indicates a slit base portion hole, symbol 170e indicates a slit, and symbol 170f indicates an electrode body portion.

As shown in FIG. 6A and FIG. 6B, the press-fit joining apparatus 100 according to the embodiment is provided with a first ring member 161 which includes an inner peripheral portion having an inner peripheral tapered portion 161a corresponding to the outer peripheral tapered portion 160c of the first collet-chuck-type electrode 160. The first ring member 161 has a function of making the first collet-chuck-type electrode 160 clamp the first member 10 by fastening the first collet-chuck-type electrode 160 from an outer peripheral side by being made to move (slide) in the proximal end direction of the first collet-chuck-type electrode 160.

The first collet-chuck-type electrode 160 is configured such that an angle of the outer peripheral tapered portion 161c with respect to an axis of the first collet-chuck-type electrode 160 falls within a range of 1° to 70°. It is more preferable that the above-mentioned angle falls within a range of 2° to 45°. It is further preferable that the above mentioned angle falls within a range of 3° to 20°.

As shown in FIG. 2 to FIG. 5B, the first ring member 161 is vertically movably mounted on a first ring member holding fitting 162 mounted on a shaft receiving plate 131 by way of a first ring holding fitting 163 and a first pneumatic cylinder mechanism 164.

The first ring member 161 is made of a metal material (for example, quenched steel or the like) harder than a material for forming the first collet-chuck-type electrode 160.

As shown in FIG. 7A and FIG. 7B, the press-fit joining apparatus 100 according to the embodiment is provided with a second ring member 171 which includes an inner peripheral portion having an inner peripheral tapered portion 170a corresponding to the outer peripheral tapered portion 170c of the second collet-chuck-type electrode 170. The second ring member 171 has a function of making the second collet-chuck-type electrode 170 clamp the second member 20 by fastening from an outer peripheral side by being made to move (slide) in the proximal end direction of the second collet-chuck-type electrode 170.

The second collet-chuck-type electrode 170 is configured such that an angle of the outer peripheral tapered portion 171c with respect to an axis of the second collet-chuck-type electrode 170 falls within a range of 1° to 70°. It is more preferable that the above-mentioned angle falls within a range of 2° to 45°. It is further preferable the above mentioned angle falls within a range of 3° to 20°.

As shown in FIG. 2 to FIG. 5B, the second ring member 171 is vertically movably mounted on a second ring member holding fitting 172 mounted on the sub platen 142 by way of a second ring holding fitting 173 and a second pneumatic cylinder mechanism 174. In FIG. 2 to FIG. 5B, the second pneumatic cylinder mechanism 174 also appears to be mounted on the shaft fixing plate 133. In an actual structure, however, the second pneumatic cylinder mechanism 174 is mounted on the sub platen 142. A cut formed in the shaft fixing plate 133 is a cut for preventing the shaft fixing plate 133 from interfering with the second pneumatic cylinder mechanism 174.

The second ring member 171 is made of a metal material (for example, quenched steel or the like) harder than a material for forming the second collet-chuck-type electrode 170.

As shown in FIG. 8A and FIG. 8B, a cooling medium flow passage 161b is formed in the first ring member 161. As shown in FIG. 9A and FIG. 9B, a cooling medium flow passage 171b is formed in the second ring member 171. The press-fit joining apparatus 100 is configured such that an electric current is supplied between the first member 10 and the second member 20 in a state where a cooling medium (for example, cooling water) is made to flow through the cooling medium flow passage 161b formed in the first ring member 161 and the cooling medium flow passage 171b formed in the second ring member 171. In FIG. 8A and FIG. 8B symbol 165 indicates a conduit through which a cooling medium is introduced into or is discharged from the cooling medium flow passage 161b. Further, in FIG. 9A and FIG. 9B, symbol 175 indicates a conduit through which a cooling medium is introduced into or is discharged from the cooling medium flow passage 171b.

The lower platen 110, the lower base plate 111, the upper platen 120, the upper base plate 121, the sub platen 142 and the spacer 143 are made of brass. The shaft receiving plate 131 and the shaft fixing plate 133 is made of non-magnetic stainless steel (for example, SUS304). That is, the lower platen 110, the upper platen 120, the shaft receiving plate 131, the shaft fixing plate 133 and the sub platen 142 are made of a non-magnetic metal material.

In the press-fit joining apparatus 100 according to the embodiment, as shown in FIG. 2, FIG. 4A, FIG. 4B, FIG. 5A and FIG. 5B, the spacer 143 is fixed to the sub platen 142 by way of an insulation member, and is not fixed to the upper platen 120.

In the press-fit joining apparatus 100 according to the embodiment, as shown in FIG. 10A and FIG. 10B, the second collet-chuck-type electrode 170 includes exchangeable second-member-holding chuck members 170g for respective portions separated by respective slits. That is, the second collet-chuck-type electrode 170 has the telescopic structure. The respective chuck members 170g are fixed to a body of the second collet-chuck-type electrode 170 by bolts 170h.

2. Press-Fit Joining Using Press-Fit Joining Apparatus According to Embodiment

FIG. 11A and FIG. 11B are views for explaining a collet chuck operation performed by pneumatic cylinder mechanisms 164, 174.

Figure 12A:
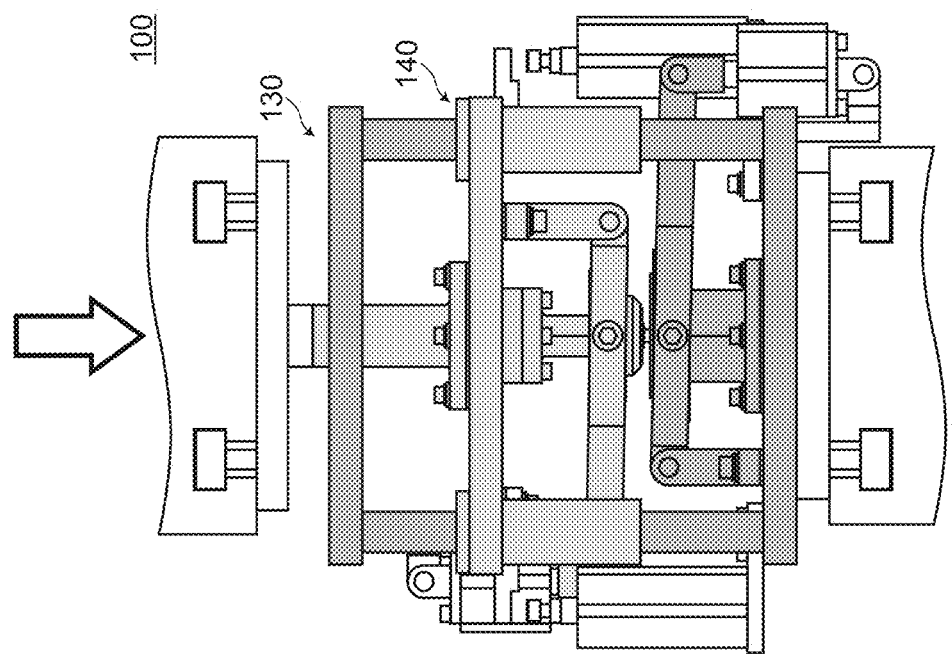
FIG. 12A and FIG. 12B are views for explaining a press-down operation of a sub platen by a pressing device.
Figure 12B:
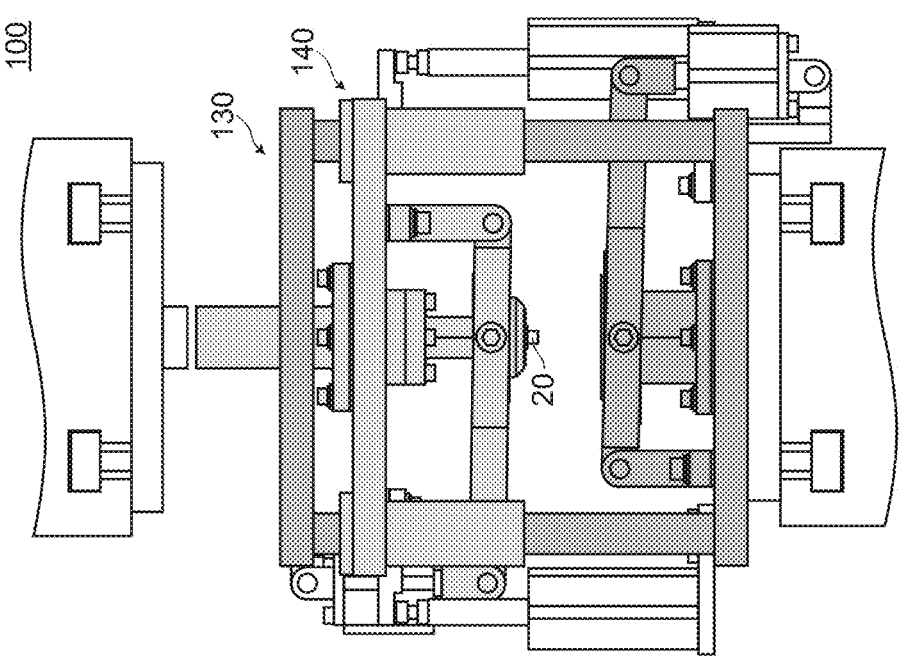

FIG. 12A and FIG. 12B are views for explaining an operation of pressing down the sub platen by the pressing device.

A step where a shaft body portion of the second member 20 is press-fit into the hole portion 12 of the first member 10 so as to join the hole portion 12 of the first member 10 and the shaft body portion of the second member 20 to each other by solid-phase diffusion joining is performed as follows using the press-fit joining apparatus 100 according to the embodiment.

(1) Make Respective Collet-Chuck-Type Electrodes Clamp Respective Works.

Firstly, as shown in FIG. 6A, the first member 10 is mounted to the first collet-chuck-type electrode 160. Thereafter, as shown in FIG. 11A and FIG. 11B, the first ring member 161 is moved in the proximal end direction of the first collet-chuck-type electrode 160 (downward direction) by operating the first pneumatic cylinder mechanism 164 (see FIG. 6B). In this manner, the first collet-chuck-type electrode 160 may be made to clamp the first member 10 by fastening the first collet-chuck-type electrode 160 from an outer peripheral side.

Next, as shown in FIG. 7A, the second member 20 is mounted on the second collet-chuck-type electrode 170. Thereafter, as shown in FIG. 11A and FIG. 11B, the second ring member 171 is moved in the proximal end direction of the second collet-chuck-type electrode 170 (upward direction) by operating the second pneumatic cylinder mechanism 174 (see FIG. 7B). In this manner, the second collet-chuck-type electrode 170 is made to clamp the second member 20 by fastening the second collet-chuck-type electrode 170 from an outer peripheral side.

The operation of making the respective collet-chuck-type electrodes clamp the respective works is not limited to the above-mentioned operation. The second member 20 may be clamped by the second collet-chuck-type electrode 170 and, thereafter, the first member 10 may be clamped by the first collet-chuck-type electrode 160. The second member 20 may be also clamped by the second collet-chuck-type electrode 170 at the same timing as the clamping of the first member 10 by the first collet-chuck-type electrode 160.

(2) Join Shaft Body Portion of Second Member to Hole Portion of First Member by Press-Fitting Next, as shown in FIG. 12A and FIG. 12B, while pressing the shaft body portion of the second member 20 to the hole portion 12 of the first member 10 by the pressing device, an electric current is supplied between the first member 10 and the second member 20 by a power source so as to generate electric resistance heat at the joining portion between the first member 10 and the second member 20. Accordingly, the shaft body portion of the second member 20 is press-fit into the hole portion 12 of the first member 10 so that the hole portion 12 of the first member 10 and the shaft body portion of the second member 20 are joined to each other by solid-phase diffusion joining. To explain this solid-phase diffusion step by reference to FIG. 8A to FIG. 9B, the solid-phase diffusion step is performed while allowing cooling water to flow through the cooling medium flow passage 161b of the first ring member 161 and the cooling medium flow passage 171b of the second ring member 171. Through these steps, a drive force transmitting part 30 is formed of the first member 10 and the second member 20.

(3) Remove Drive Force Transmitting Part

Next, a clamping state of the drive force transmitting part 30 by the second collet-chuck-type electrode 170 is released by moving the second ring member 171 in the direction toward a distal end of the second collet-chuck-type electrode 170 (downward direction) by operating the second pneumatic cylinder mechanism 174. Thereafter, a pressing state of the upper platen 120 by the pressing device is released, and a height position of the sub platen structural body 142 is made to return to an original position by operating the third pneumatic cylinder mechanism 150. Thereafter, a clamping state of the drive force transmitting part 30 by the first collet-chuck-type electrode 160 is released by moving the first ring member 161 in the direction toward a distal end of the first collet-chuck-type electrode 160 (upward direction) by operating the first pneumatic cylinder mechanism 164. Thereafter, the drive force transmitting part 30 is removed from the press-fit joining apparatus 100.

As explained above, the drive force transmitting part 30 shown in FIG. 1B is manufactured using the press-fit joining apparatus 100 according to the embodiment in such a manner that the shaft body portion of the second member 20 is press-fit into the hole portion 12 of the first member 10 so as to join the hole portion 12 of the first member 10 and the shaft body portion of the second member 20 to each other by solid-phase diffusion joining.

It is not always necessary to perform the operation (1) where the respective works are clamped by the respective collet-chuck-type electrodes, the operation (2) where the shaft body portion of the second member is joined to the hole portion of the first member by press-fit joining, and the operation (3) where the drive force transmitting part is removed in the above-mentioned order. These operations may be performed in the order different from the above-mentioned order.

Figure 13A:
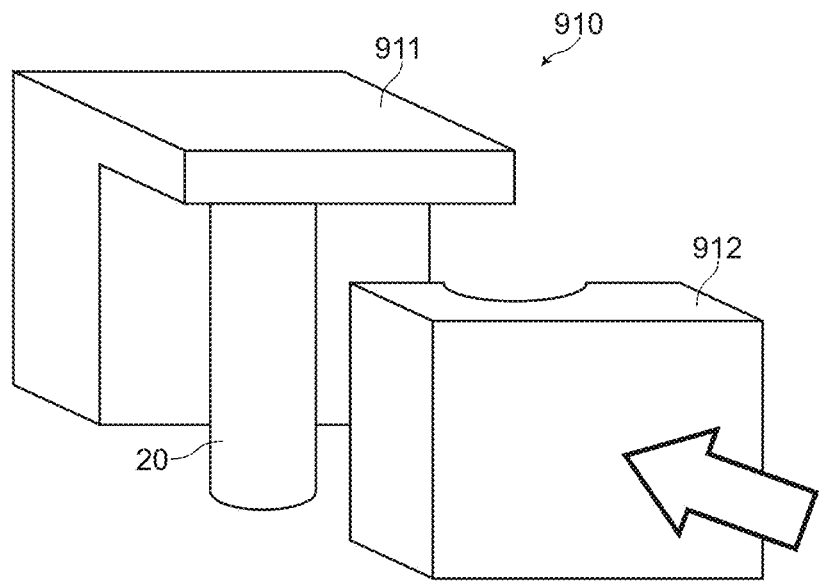
FIG. 13A and FIG. 13B are views for explaining an electrode fixing method in a comparison example.
Figure 13B:
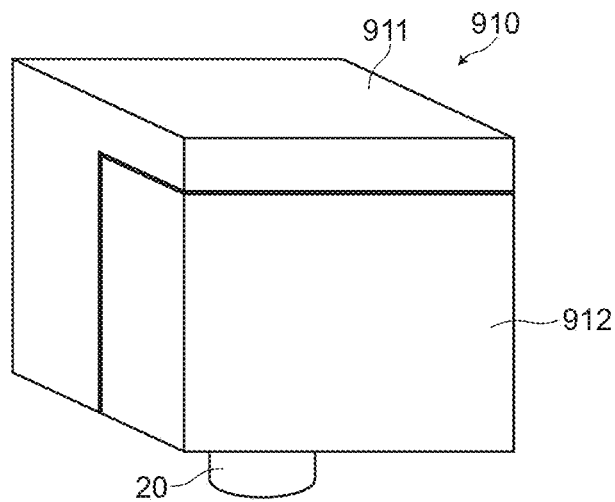
Figure 14A:
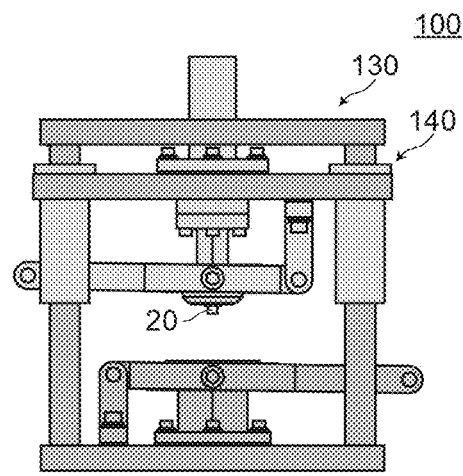
FIG. 14A to FIG. 14D are views for explaining a mouth opening phenomenon and a magnetic field in a conventional press-fit joining apparatus.
Figure 14B:
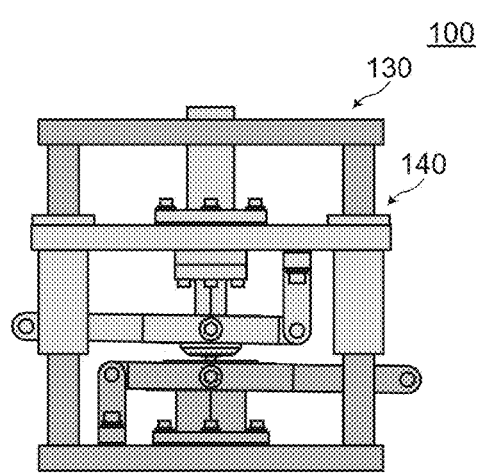
Figure 14C:
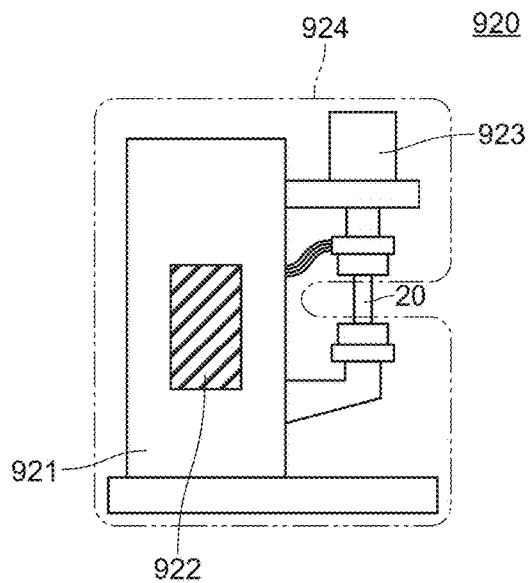
Figure 14D:
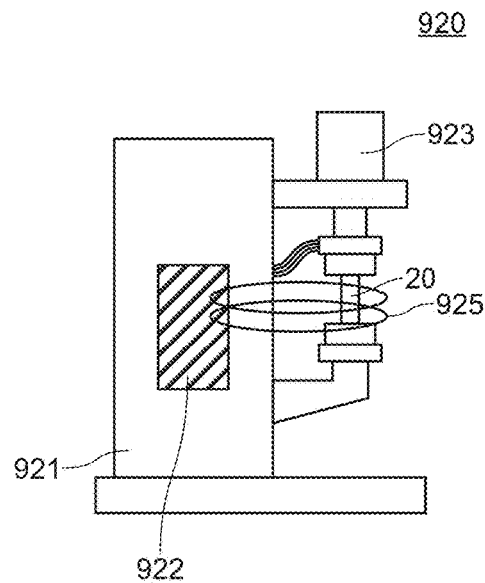
Figure 15:
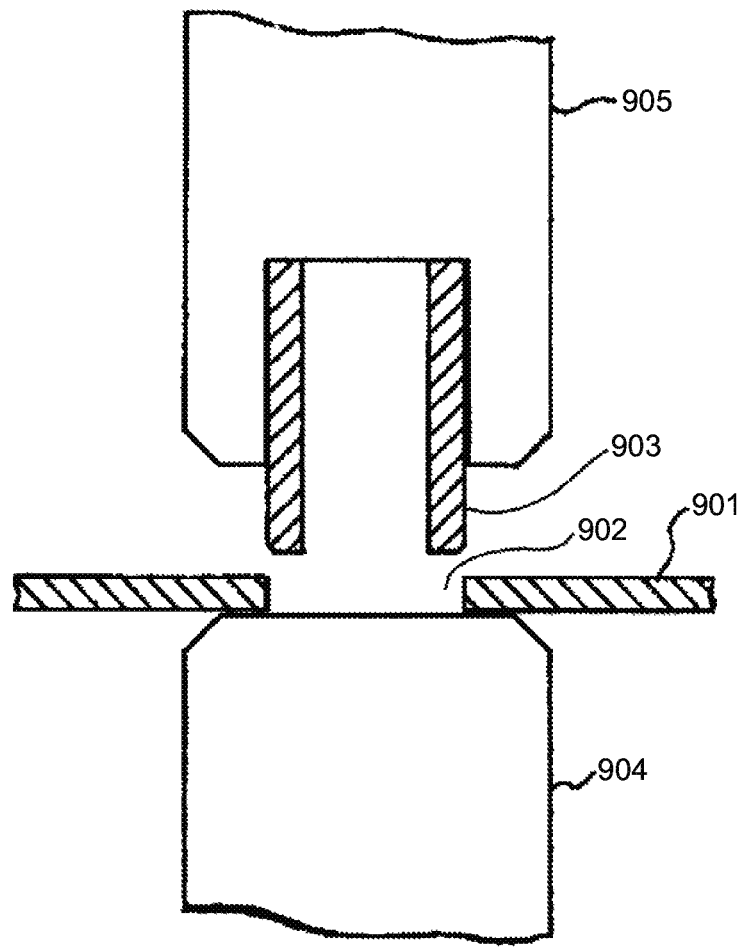
FIG. 15 is a view for explaining a conventional press-fit joining method.

3. Advantageous Effects Acquired by Press-Fit Joining Apparatus According to Embodiment FIG. 13A and FIG. 13B are views for explaining an electrode fixing method according to a comparison example.

FIG. 14A to FIG. 14D are views for explaining a mouth opening phenomenon and a magnetic field in a conventional press-fit joining apparatus.

According to the press-fit joining apparatus 100 of the embodiment, as electrodes for making an electric current (welding current) to flow between the first member 10 and the second member 20, two collet-chuck-type electrodes (the first collet-chuck-type electrode 160 and the second collet-chuck-type electrode 170) are provided and hence, compared to the electrode fixing method of the comparison example (see FIG. 13), an electric current uniformly flows over the whole circumference of the joining portion between the first member and the second member whereby coaxiality between the first and the second members and a strength of joining between the first member and the second member are enhanced.

Further, according to the press-fit joining apparatus 100 of the embodiment, two electrodes (the first collet-chuck-type electrode 160 and the second collet-chuck-type electrode 170) are held using the above-mentioned die set structural body 130 and sub platen structural body 140 and hence, the rigidity of the press fit joining apparatus is increased. Accordingly, unlike a conventional C-shaped frame housing (see FIG. 14(c)), a mouth opening phenomenon (a phenomenon where when a press-fitting operation is performed by a pressing device, two electrodes receive a force in the direction that the C-shaped frame housing is opened due to a reaction force generated in the press-fitting operation) does not occur in the press-fit joining apparatus 100 of the embodiment whereby the press-fit joining apparatus 100 can acquire high runout accuracy. Further, even when a large force which attracts the first member and the second member is generated on a transformer side by a strong magnetic field (see FIG. 14D) generated in the transformer of a power source device (see FIG. 14D), the rigidity of the die set structural body 130 and the sub platen structural body 140 is increased as described above and hence, the coaxiality of the first member and the second member held by two electrodes which are mounted on the die set structural body and the sub platen structural body can be maintained at a high level (see FIG. 14A and FIG. 14B).

Further, according to the press-fit joining apparatus 100 of the embodiment, two collet-chuck-type electrodes (the first collet-chuck-type electrode 160 and the second collet-chuck-type electrode 170) are held using the above-mentioned die set structural body 130 and sub platen structural body 140 (see FIG. 6A to FIG. 7B) and hence, the respective works can be clamped by the respective collet-chuck-type electrodes with high axial accuracy with reference to outer diameters of the works (the first member and the second member) and hence, the coaxiality of the first member and the second member (coaxiality of the hole portion of the first member and a shaft body portion of the second member) can be easily increased.

As a result, the press-fit joining apparatus 100 of the embodiment becomes a press-fit joining apparatus which can manufacture products which are required to have higher coaxiality and higher joining strength than prior art (for example, products such as a drive force transmitting part, the manufacture of which requires the supply of a large and uniform electric current to a joining portion).

According to the press-fit joining apparatus 100 of the embodiment, both the respective collet-chuck-type electrodes (the first collet-chuck-type electrode 160 and the second collet-chuck-type electrode 170) respectively include the outer peripheral portions which have the outer peripheral tapered portions 160c, 170c whose outer diameters are gradually increased in the proximal end direction, and the respective ring members (the first ring member 161 and the second ring member 171) have the inner peripheral tapered portions 161a, 171a corresponding to the outer peripheral tapered portions 160c, 170c of the respective collet-chuck-type electrodes (see FIG. 6A to FIG. 7B). Accordingly, the works (the first member and the second member) can be clamped by the respective collet-chuck-type electrodes by fastening the respective collet-chuck-type electrodes from an outer peripheral side by moving (sliding) the respective ring members in proximal directions of the respective collet-chuck-type electrodes. As a result, the works (the first part and the second part) can be uniformly and easily fastened with reference to the outer diameters of the works.

According to the press-fit joining apparatus 100 of the embodiment, as shown in FIG. 2 to FIG. 5B, the first ring member 161 is (vertically movably) mounted on the first ring member holding fitting 162 mounted on the shaft receiving plate 131 (by way of the first ring mounting fitting 163 and the first pneumatic cylinder mechanism 164), and the second ring member 171 is (vertically movably) mounted on the second ring member holding fitting 172 which is mounted on the sub platen 142 (by way of the second ring mounting fitting 173 and the second pneumatic cylinder mechanism 174). Due to such a constitution, the works (the first part and the second part) can be uniformly and rapidly fastened with reference to the outer diameters of the works (the first part and the second part). Particularly, by combining the first ring member holding fitting and the second ring member holding fitting with the pneumatic cylinder mechanism, compared to a case where the work is fastened by screw fastening, a time necessary for carrying out the whole press-fit joining step can be largely shortened.

According to the press-fit joining apparatus 100 of the embodiment, the first collet-chuck-type electrode 160 is configured such that an angle of the outer peripheral tapered portion 160c with respect to an axis of the first collet-chuck-type electrode 160 falls within a range of 1° to 70°, and the second collet-chuck-type electrode 170 is configured such that an angle of the outer peripheral tapered portion 170c with respect to an axis of the second collet-chuck-type electrode 170 falls within a range of 1° to 70°. Due to such a constitution, at the time of moving (sliding) the respective ring members (the first ring member 161 and the second ring member 171) in the proximal end directions of the respective collet-chuck-type electrodes (the first collet-chuck-type electrode 160 and the second collet-chuck-type electrode 170), such a moving (sliding) operation can be efficiently converted into a work fastening operation.

According to the press-fit joining apparatus 100 of the embodiment, both the first ring member 161 and the second ring member 171 are made of a metal material (such as quenched steel) harder than a material for forming the first collet-chuck-type electrode 160 and the second collet-chuck-type electrode 170. Due to such a constitution, by making the respective ring members (the first ring member 161 and the second ring member 171) move (slide) in the proximal end directions of the respective collet-chuck-type electrodes (the first collet-chuck-type electrode 160 and the second collet-chuck-type electrode 170), the respective collet-chuck-type electrodes can be surely fastened from the outer peripheral side thus allowing the respective collet-chuck-type electrodes to clamp the respective works (the first member 10 and the second member 20).

According to the press-fit joining apparatus 100 of the embodiment, the cooling medium flow passage is formed in the inside of both of the respective ring members (the first ring member 161 and the second ring member 171) (see FIG. 8A to FIG. 9B), and the press-fit joining apparatus 100 is configured such that an electric current is supplied between the first member and the second member in a state where a cooling medium is made to flow through the cooling medium flow passage 161*b* of the first ring member 161 and the cooling medium flow passage 171*b* of the second ring member 171. Due to such a constitution, with the use of two collet-chuck-type electrodes (the first collet-chuck-type electrode and the second collet-chuck-type electrode) having the front split structural body, both of these two collet-chuck-type electrodes can be cooled. As a result, it is possible to suppress electric resistances of these two collet-chuck-type electrodes from being increased. Further, it is possible to extend lifetimes of both of these two collet-chuck-type electrodes.

In this case, overheating of the collet-chuck-type electrode can be efficiently prevented even when compared with a conventional cooling mechanism (a mechanism which cools electrodes by way of a base plate by arranging a cooling water pipe in a platen).

According to the press-fit joining apparatus 100 of the embodiment, the lower platen 110, the upper platen 120, the shaft receiving plate 131, the shaft fixing plate 133 and the sub platen 142 are formed using a non-magnetic metal material. Due to such a constitution, even under the presence of a strong magnetic field generated in the transformer of the power source device (see FIG. 14D), (unlike the case where these members are formed using a magnetic metal material), it is possible to prevent a possibility that these members are easily magnetized. As a result, a possibility that an operational defect occurs in the press-fit joining apparatus becomes extremely low or a possibility that dust such as iron powder or the like is attracted to these members can be eliminated.

According to the press-fit joining apparatus 100 of the embodiment, as shown in FIG. 2 to FIG. 4B, the spacer 143 is fixed to one of the sub platen 142 and the upper platen 120, but the spacer 143 is not fixed to the other platen. In this manner, since the spacer 143 is fixed to one of the sub platen 142 and the upper platen 120, and the spacer 143 is not fixed to the other platen, the press-fit joining apparatus 100 is not influenced by a mouth opening phenomenon which occurs due to a C-shaped frame housing (see FIG. 14C).

According to the press-fit joining apparatus 100 of the embodiment, as shown in FIG. 10A and FIG. 10B, the second collet-chuck-type electrode 170 has an exchangeable chuck member 170*g* for holding the second member for every portion separated by the respective slits. Accordingly, even when only the chuck portion which clamps the work deteriorates in the collet-chuck-type electrodes, at least with respect to the second collet-chuck-type electrode 170, it is sufficient to exchange only the chuck member instead of exchanging the second collet-chuck-type electrode as a whole and hence, a manufacturing cost can be reduced.

Although the press-fitting joining apparatus of the present invention has been explained based on the above-mentioned embodiment, the present invention is not limited to the above-mentioned embodiment, and various other modifications can be carried out without departing from the gist of the present invention. For example, the following modifications also fall within the scope of the present invention.

(1) In the above-mentioned embodiment, as the spacer, the spacer 143 which is fixed to the sub platen 142 and is not fixed to the upper platen 120 is used. However, the present invention is not limited to such a spacer 143. In the present invention, a spacer which is fixed to the upper platen 120 and is not fixed to the sub platen 142 may be also used. In the present invention, a spacer which is fixed to neither the sub platen 142 nor the upper platen 120 may be also used.

(2) In the above-mentioned embodiment, the second collet-chuck-type electrode 170 which has the exchangeable chuck member 170*g* for holding the second member is used as the second collet-chuck-type electrode for every portion separated by respective slits. However, the present invention is not limited to such a structure. As the first collet-chuck-type electrode, a first collet-chuck-type electrode which has an exchangeable chuck member for holding the first member may be used for every portion separated by respective slits.

(3) In the above-mentioned embodiment, the pneumatic cylinder mechanism (the third pneumatic cylinder mechanisms 150) is used as an elastic mechanism for returning a height position of the sub platen structural body 140 pressed down by the pressing device to an original position. However, the present invention is not limited to the pneumatic cylinder mechanism (the third pneumatic cylinder mechanisms 150). In addition to or in place of the pneumatic cylinder mechanism (third pneumatic cylinder mechanisms 150), spring coils having a function of imparting a repulsive force to the plurality of respective bearing mechanisms 141 may be mounted on the respective slide shafts 132. In this case, the spring coils may have a function of imparting a repulsive force to a pressing operation of the sub platen structural body 140 when the sub platen structural body 140 is pressed down.

(4) In the above-mentioned embodiment, the second member 20 formed of only the shaft body portion is used as the second member. However, the present invention is not limited to the second member 20. As the second member 20, a second member which includes a portion other than the shaft body portion in addition to the shaft body portion may be used.

(5) In the above-mentioned embodiment, the pneumatic cylinder mechanism is used as the pressing device for imparting a pressing force to the upper platen. However, the present invention is not limited to the pneumatic cylinder mechanism. A pressing device formed of a servo motor and a ball screw may be also used.

(6) In the above-mentioned embodiment, the cooling medium flow passage is formed in the inside of both ring members (the first ring member 161 and the second ring member 171). However, the present invention is not limited to such a structure. The cooling medium flow passage may be formed in only one of the first ring member 161 and the second ring member 171. Alternatively, the cooling medium flow passage may be formed in neither one of the first ring member 161 and the second ring member 171.

REFERENCE SIGNS LIST

10, 40: first member, 20, 50: second member, 30, 60: drive force transmitting part, 100: press-fit joining apparatus, 110: lower platen, 111: lower base plate; 120: upper platen, 121: upper base plate, 130: die set structural body, 131: shaft receiving plate, 132: slide shaft, 133: shaft fixing plate, 140: sub platen structural body, 141: bearing mechanism, 142: sub platen, 143: spacer, 150: third pneumatic cylinder mechanism, 160: first collet-chuck-type electrode, 160c, 170c: outer peripheral tapered portion, 160e, 170e: slit; 160f, 170f: electrode body portion, 161: first ring member, 162: first ring member holding fitting, 163: first ring fitting, 164: first pneumatic cylinder mechanism, 170: second collet-chuck-type electrode, 171: second ring member, 172: second ring member holding fitting, 173: second ring fitting, 174: second pneumatic cylinder mechanism

The invention claimed is:

1. A press-fit joining apparatus where an electric current is supplied between a first member having a hole portion and a second member having a shaft body portion with a predetermined press-fitting margin between the shaft body portion and the hole portion of the first member while pressing the shaft body portion of the second member to the hole portion of the first member with a predetermined pressure thus generating electric resistance heat in a joining portion between the first member and the second member so that the shaft body portion of the second member is press-fitted into the hole portion of the first member whereby the hole portion of the first member and the shaft body portion of the second member are joined to each other by solid-phase diffusion joining, the press-fit joining apparatus comprising:
   a housing;
   a power source device;
   a pressing device;
   a lower platen fixed to the housing and connected to one electrode of the power source device;
   an upper platen connected to an other electrode of the power source device and capable of being pressed down toward the lower platen by the pressing device;
   a die set structural body including: a shaft receiving plate fixed to the lower platen; a plurality of slide shafts mounted on the shaft receiving plate in a raised manner; and a shaft fixing plate fixed by the plurality of slide shafts and having a hole at a center portion thereof;
   a sub platen structural body including: a plurality of bearing mechanisms which are respectively pivotally supported on the plurality of slide shafts and a sub platen fixed to the bearing mechanism and being mounted on the plurality of slide shafts by way of the bearing mechanisms in a vertically movable manner with respect to the plurality of slide shafts, and capable of being pressed down toward the lower platen by the pressing device by way of the upper platen and a spacer arranged between the upper platen and the sub platen;
   an elastic mechanism for returning a height position of the sub platen structural body pressed down by the pressing device to an original position;
   a first collet-chuck electrode mounted on the shaft receiving plate, and having three or more slits formed therein; and
   a second collet-chuck electrode mounted on the sub platen, and having three or more slits formed therein.

2. The press-fit joining apparatus according to claim 1, wherein both the first collet-chuck electrode and the second collet-chuck electrode respectively include an outer peripheral portion which has an outer peripheral tapered portion whose outer diameter is gradually increased in a proximal end direction, and
   the press-fit joining apparatus further includes:
   a first ring member which includes an inner peripheral portion having an inner peripheral tapered portion corresponding to the outer peripheral tapered portion of the first collet-chuck electrode, the first ring member being configured to fastening the first collet-chuck electrode from an outer peripheral side from being made to move in the proximal end direction of the first collet-chuck electrode thus allowing the first collet-chuck electrode to clamp the first member, and
   a second ring member which includes an inner peripheral portion having an inner peripheral tapered portion corresponding to the outer peripheral tapered portion of the second collet-chuck electrode, the second ring member being configured to fastening the second collet-chuck electrode from an outer peripheral side from being made to move in the proximal end direction of the second collet-chuck electrode thus allowing the second collet-chuck electrode to clamp the second member.

3. The press-fit joining apparatus according to claim 1, wherein the lower platen, the upper platen, the shaft receiving plate, the shaft fixing plate and the sub platen are formed using a non-magnetic metal material.

4. The press-fit joining apparatus according to claim 1, wherein the spacer is fixed to one of the sub platen and the upper platen, and the spacer is not fixed to the other platen.

5. The press-fit joining apparatus according to claim 1, wherein the spacer is fixed to neither the sub platen nor the upper platen.

6. The press-fit joining apparatus according to claim 1, wherein the second collet-chuck electrode has an exchangeable chuck member for holding the second member for every portion separated by respective slits.

7. The press-fit joining apparatus according to claim 2, wherein the first ring member is vertically movably mounted on a first ring member holding fitting which is mounted on the shaft receiving plate, and
   the second ring member is vertically movably mounted on a second ring member holding fitting which is mounted on the sub platen.

8. The press-fit joining apparatus according to claim 2, wherein the first collet-chuck electrode is configured such that an angle of the outer peripheral tapered portion with respect to an axis of the first collet-chuck electrode falls within a range of 1° to 70°, and
   the second collet-chuck electrode is configured such that an angle of the outer peripheral tapered portion with respect to an axis of the second collet-chuck electrode falls within a range of 1° to 70°.

9. The press-fit joining apparatus according to claim 2, wherein both the first ring member and the second ring member are made of a metal material harder than a material for forming the first collet-chuck electrode and a material for forming the second collet-chuck electrode.

10. The press-fit joining apparatus according to claim 2, wherein a cooling medium flow passage is formed in the inside of at least one of the first ring member and the second ring member, and
    the press-fit joining apparatus is configured such that an electric current is supplied between the first member and the second member in a state where a cooling medium is made to flow through the cooling medium flow passage.

* * * * *